(12) United States Patent
Kim (10) Patent No.: US 7,099,976 B2
(45) Date of Patent: Aug. 29, 2006

(54) BUS ARBITER AND BUS ARBITRATING METHOD

(75) Inventor: Young-Sik Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 256 days.

(21) Appl. No.: 10/752,963

(22) Filed: Jan. 7, 2004

(65) Prior Publication Data

US 2004/0236889 A1    Nov. 25, 2004

(30) Foreign Application Priority Data

May 24, 2003    (KR) .................. 10-2003-0033247

(51) Int. Cl.
*G06F 12/06*    (2006.01)

(52) U.S. Cl. ........................................ 710/244

(58) Field of Classification Search ............ None
See application file for complete search history.

(56) References Cited

U.S. PATENT DOCUMENTS

| | | | | |
|---|---|---|---|---|
| 5,440,713 A | * | 8/1995 | Lin et al. ................... | 711/158 |
| 6,202,137 B1 | * | 3/2001 | Ottinger .................... | 711/168 |
| 6,249,847 B1 | * | 6/2001 | Chin et al. ................. | 711/151 |
| 6,330,646 B1 | * | 12/2001 | Clohset et al. ............. | 711/158 |
| 6,349,370 B1 | * | 2/2002 | Imamura .................... | 711/147 |
| 6,792,516 B1 | * | 9/2004 | Mastronarde et al. ....... | 711/158 |
| 2004/0006665 A1 | * | 1/2004 | Moss .......................... | 711/5 |
| 2004/0078544 A1 | * | 4/2004 | Lee et al. ................... | 711/202 |

FOREIGN PATENT DOCUMENTS

JP        10143428 A   *   5/1998

OTHER PUBLICATIONS

English Abstract*** of KR 2002 0089428.

* cited by examiner

*Primary Examiner*—Paul R. Myers
(74) *Attorney, Agent, or Firm*—F. Chau & Associates, LLC (57) ABSTRACT

Provided are a bus arbiter and a bus arbitrating method. The bus arbiter comprises a bus request register file, a bank register file, and a comparing circuit, thereby preferentially assigning a bus grant signal to a bus master causing a page hit among a plurality of bus masters outputting bus request signals. The bus request register file stores each of the memory access address output from corresponding bus master. The bank register file stores a page index stored in a sense amplifier of corresponding memory bank of an external memory device. The comparing circuit compares a page index stored in a register of a bank register file selected based on corresponding memory access address with a page index stored in the bus request register file and then outputs a page hit or page miss to the bus request register file according to the comparison result. The bus arbiter preferentially assigns a bus grant signal granting access to the bus to a bus master causing the page hit.

8 Claims, 8 Drawing Sheets

BUS ARBITER AND BUS ARBITRATING METHOD

BACKGROUND OF THE INVENTION

1. Field of the Invention

The present invention relates to a bus arbiter and a bus arbitrating method, and more particularly, to a bus arbiter and a bus arbitrating method, by which a bus grant signal is preferentially assigned to a bus master that generates a bus request signal causing a page hit.

2. Description of the Related Art

Typically, a bus arbiter performs bus arbitration between a plurality of bus masters connected to a bus. Each of the plurality of bus masters outputs a bus request signal to the bus arbiter. The bus request signal comprises information for requesting access to the bus.

The bus arbiter receives bus request signals, each of which is generated by each of the plurality of bus masters, and outputs a bus grant signal to each of the plurality of bus masters according to a predetermined order. The bus grant signal comprises information for granting access to the bus.

A conventional bus arbiter performs bus arbitration according to a fixed priority scheme and a fairness scheme including, for example, round-robin scheduling. According to the fixed priority scheme, the bus arbiter pre-emptively assigns different priorities to the plurality of bus masters and outputs a bus grant signal to a bus master having the highest priority. The priority assigned to each of the plurality of bus masters is set to a specific value.

Round-robin scheduling comprises selecting all elements included in one group according to a rational order and a predetermined notion of fairness, where each element is sequentially selected from a list from top to bottom. The selection is repeated after returning to the top of the list. In other words, round-robin scheduling pertains to taking turns.

Thus, in a bus arbiter using round-robin scheduling, each bus master uses a bus according to a rational order. As a result, even when a certain bus master needs to preferentially access a bus, the bus master cannot access the bus until its turn in the round-robin schedule.

In a bus arbiter using the fixed priority scheme, a bus master having a low priority may not access a bus. That is, it is difficult to change hardware of the bus arbiter.

As a consequence, the bus arbiter using the fixed priority scheme and fairness scheme, including round-robin scheduling, cannot reduce a memory access latency. Memory access latency has a significant influence upon the performance of a system on chip (SOC).

Therefore, a need exists for a system and method fur reducing memory access latency to improve the performance of a SOC semiconductor.

SUMMARY OF THE INVENTION

A bus arbiter and a bus arbitrating method preferentially assign a bus grant signal to a bus master that generates a bus request signal causing a page hit.

According to an embodiment of the present invention, a bus arbiter outputs a bus grant signal to a bus master granted access to a bus based on bus request signals and memory access addresses, each of which is output from respective M bus masters connected to the bus. The bus arbiter comprises a bus request register file, a bank register file, and a comparing circuit. The bus request register file comprises M registers, each of which stores each of the memory access address output from a corresponding bus master. The bank register file comprises N registers, each of which stores a page index stored in a sense amplifier of a corresponding memory bank of an external memory device. The comparing circuit comprises M comparators, each of which compares a page index stored in a register of the bank register file selected based on a corresponding memory access address with a page index stored in each of the M registers of the bus request register file and then outputs a page HIT or page MISS to each of the M registers of the bus request register file according to the comparison result. The bus arbiter preferentially assigns a bus grant signal granting access to the bus to a bus master causing the page HIT.

The bus arbiter assigns a bus grant signal to a bus master causing the page MISS according to a fairness scheme.

According to an embodiment of the present invention, a bus arbiter outputs a bus grant signal to a bus master granted access to a bus based on bus request signals and memory access addresses, each of which is output from respective M bus masters connected to the bus. The bus arbiter comprises a request register file including M registers, a bank register file including N registers, and a comparing circuit including M comparators. Each of the M registers comprises a page index field that stores a page index output from a corresponding bus master and a bank index that stores a bank index output from the corresponding bus master. Each of the N registers comprises an open page index field that stores a page index stored in a sense amplifier of a memory bank of an external memory device. Each of the M comparators compares a page index stored in an index page field of each of the M registers with an open page index stored in a register of the bank register file selected based on a bank index stored in a bank index field of each of the M registers. Each of the M comparators outputs the comparison result to a page HIT/page MISS field of each of the M registers. The bus arbiter preferentially assigns a bus grant signal granting access to the bus to a bus master causing the page HIT.

The bus arbiter assigns a bus grant signal to a bus master causing the page MISS according to a fairness scheme.

According to an embodiment of the present invention, a bus arbitrating method comprises outputting a bus grant signal to a bus master granted access to a bus based on bus request signals and memory access addresses, each of which is output from a plurality of bus masters connected to the bus. The bus arbitrating method comprises storing a page index and a bank index, included in each of the memory access addresses, in a corresponding register of a bus request register file, storing corresponding open page index and searching for a register corresponding to the bank index, comparing the page index with the open page index and storing a page HIT/page MISS in a corresponding register of the bus request register file according to the comparison result, and preferentially assigning a bus grant signal granting access to the bus to a bus master causing the page HIT.

The bus arbitrating method further comprises assigning a bus grant signal to a bus master causing the page MISS according to a fairness scheme.

BRIEF DESCRIPTION OF THE DRAWINGS

Preferred embodiments of the present invention will be described below in more detail with reference to the attached drawings in which.

DETAILED DESCRIPTION OF PREFERRED EMBODIMENTS

The present invention will now be described more fully with reference to the accompanying drawings, in which preferred embodiments of the invention are shown. In the drawings, like reference numerals are used to refer to like elements throughout.

Figure 1:
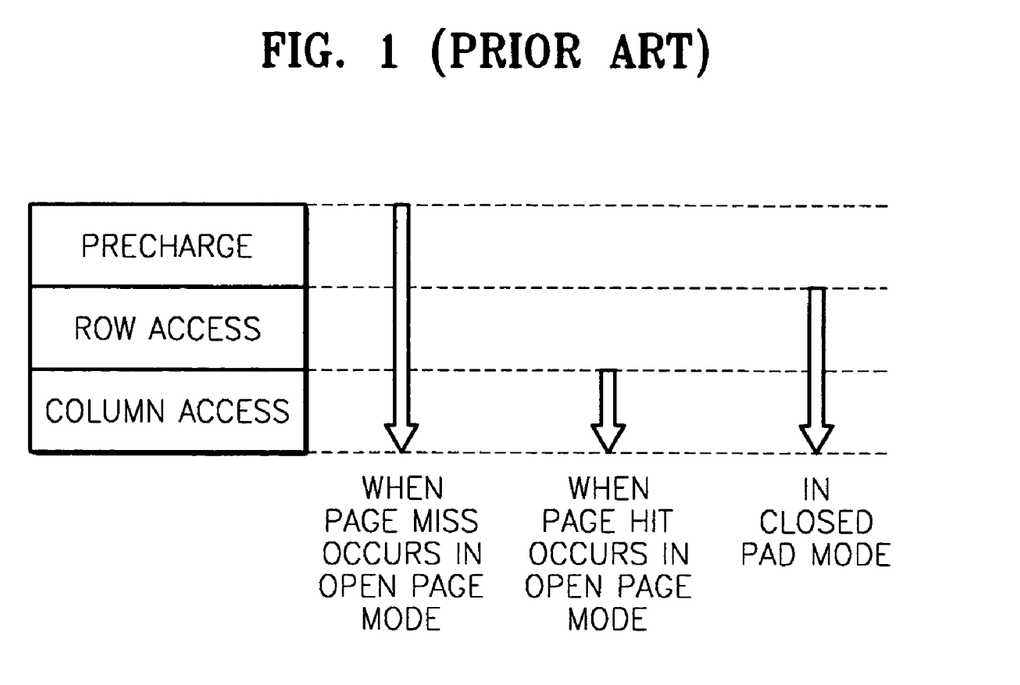
FIG. 1 illustrates a page mode of a general memory controller.

FIG. 1 illustrates a page mode of a memory controller. Referring to FIG. 1, the page mode of the memory controller can be classified into an open page mode and a closed page mode according to a time when memory cells constituting a memory device are precharged.

In the open page mode, a valid page requested by a bus master is stored in a sense amplifier of a corresponding memory bank. In the closed page mode, the valid page requested by the bus master is not stored in the sense amplifier of the corresponding memory bank.

In the open page mode, precharging and a row access are performed when a page MISS occurs, whereas a column access with respect to an active row is performed when a page HIT occurs. When the page HIT occurs in the open page mode, a memory access latency is reduced.

The page HIT means that the valid page requested by the bus master is stored in the sense amplifier. The page MISS means that the valid page requested by the bus master is not stored in the sense amplifier. In the closed page mode, the row access and the column access are performed.

Figure 2:
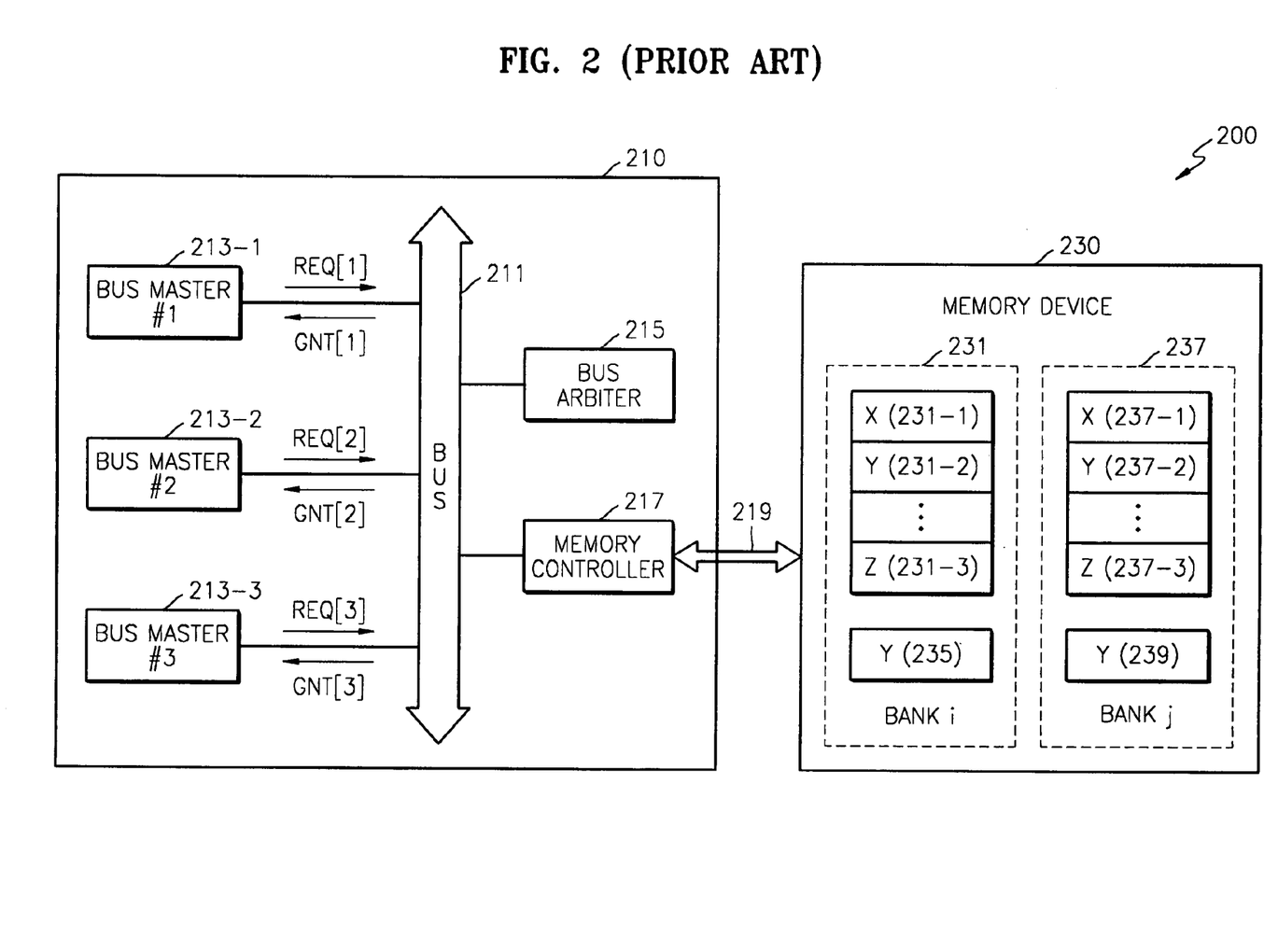
FIG. 2 illustrates a system using a conventional bus arbitrating method.

FIG. 2 illustrates a system using a conventional arbitrating method. Referring to FIG. 2, a system 200 comprises a chip 210 implemented as a system on chip (SOC) semiconductor, a memory device 230, and an external bus 219.

The chip 210 comprises a bus 211, three bus masters 213-1, 213-2, and 213-3, a bus arbiter 215, and a memory controller 217. Each of the bus masters 213-1, 213-2, and 213-3 independently accesses the memory device 230 under the control of the bus arbiter 215 and the memory controller 217.

The memory controller 217 controls a data write operation where each of the bus masters 213-1, 213-2, and 213-3 writes data to the memory device 230 and a data read operation where each of the bus masters 213-1, 213-2, and 213-3 reads data from the memory device 230.

Dynamic Random Access Memory (DRAM), Synchronous DRAM (SDRAM), SDRAM Double Data Rate (SDRAM-DDR), RAMBUS™ DRAM, etc., may be used as the memory device 230. A basic access to the memory device 230 comprises the open page mode or the closed page mode described with reference to FIG. 1.

The memory device 230 comprises several internal banks to improve integration and to reduce a memory access time.

In FIG. 2, three bus masters 213-1, 213-2, and 213-3 and two memory banks 231 and 237 are illustrated for convenience of explanation.

The memory bank 231 comprises a plurality of pages 231-1 through 231-3 and a sense amplifier 235, also called a 'buffer'. The memory bank 237 comprises a plurality of pages 237-1 through 237-3 and a sense amplifier, or a buffer, 239. Each of the sense amplifiers 235 and 239 stores one page at a time.

Figure 3:
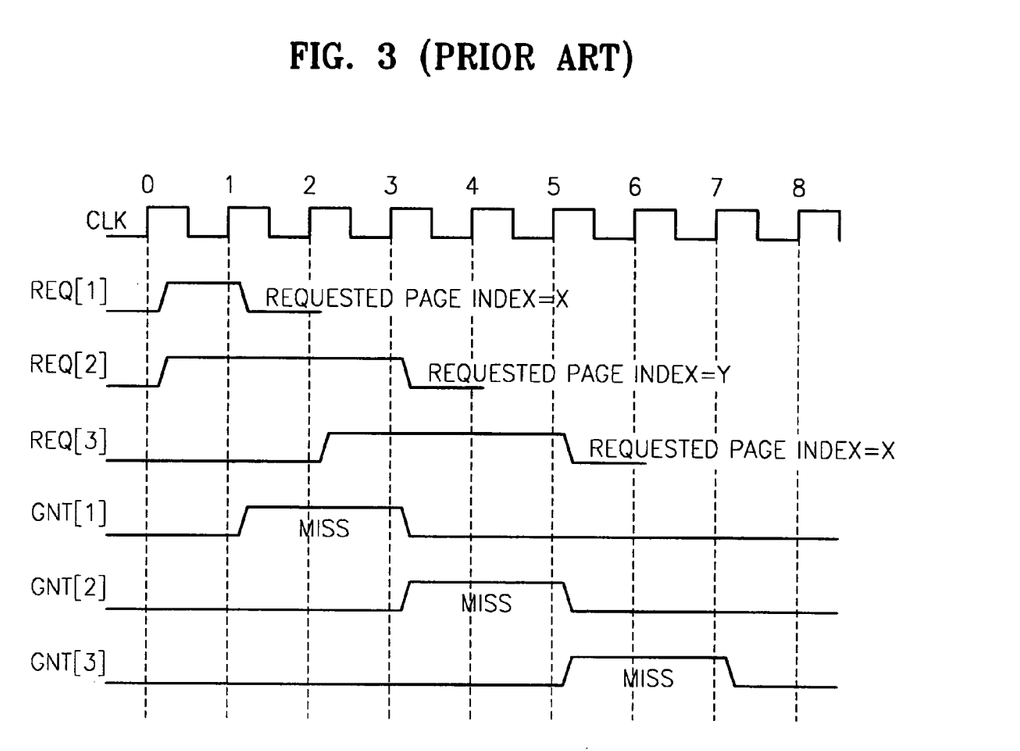
FIG. 3 illustrates a timing diagram for the operation of the system of FIG. 2.

FIG. 3 illustrates a timing diagram for the operation of the system 200 of FIG. 2. Referring to FIGS. 2 and 3, all signals operate in synchronization with a rising edge of a clock signal CLK and are high active.

REQ[1] represents a bus request signal of the bus master 213-1. Here, a page index requested by the bus master 213-1 is X. REQ[2] represents a bus request signal of the bus master 213-2. Here, a page index requested by the bus master 213-2 is Y. REQ[3] represents a bus request signal of the bus master 213-3. Here, a page index requested by the bus master 213-3 is X.

GNT[1], GNT[2], and GNT[3] represent bus grant signals that are respectively output to the bus masters 213-1, 213-2, and 213-3 by the bus arbiter 215.

It is assumed that the priority of the bus master 213-1 is higher than that of the bus master 213-2 and the priority of the bus master 213-2 is higher than that of the bus master 213-3.

Each of the bus masters 213-1, 213-2, and 213-3 accesses the same memory bank i 231. An open page index stored in the sense amplifier 235 at a clock signal CLK number 0 is Y.

When the page MISS occurs, the memory access latency is assumed to be a two-clock cycle. When the page HIT occurs, the memory access latency is assumed to be a one-clock cycle.

At a clock signal CLK number 1, the priority of the bus master 213-1 is higher than that of the bus master 213-2, and the page index requested by the bus master 213-1 is X while the page index stored in the sense amplifier 235 is Y. Thus, the bus arbiter 215 outputs the bus grant signal GNT[1] corresponding to the page MISS to the bus master 231-1.

In response to the page index X requested by the bus master 213-1, the page index Y stored in the sense amplifier 235 changes into X.

At a clock signal CLK number 2, the page index requested by the bus master 213-2 is Y while the page index stored in the sense amplifier 235 is X. Thus, the bus arbiter 215 outputs the bus grant signal GNT[2] corresponding to the page MISS to the bus master 231-2.

In response to the page index Y requested by the bus master 213-2, the page index X stored in the sense amplifier 235 changes into Y.

At clock signal CLK numbers 4 and 5, the page index requested by the bus master 213-3 is X while the page index stored in the sense amplifier 235 is Y. Thus, the bus arbiter 215 outputs the bus grant signal GNT[3] corresponding to the page MISS to the bus master 213-3.

In response to the page index X requested by the bus master 213-3, the page index Y stored in the sense amplifier 235 changes into X.

Referring to FIGS. 2 and 3, in response to each of the bus request signals REQ[1], REQ[2], and REQ[3], the bus arbiter 215 outputs the bus grant signals GNT[1], GNT[2], and GNT[3] corresponding to the page MISS to the bus masters 213-1, 213-2, and 213-3, respectively. As a result, the memory access latency increases.

Figure 4:
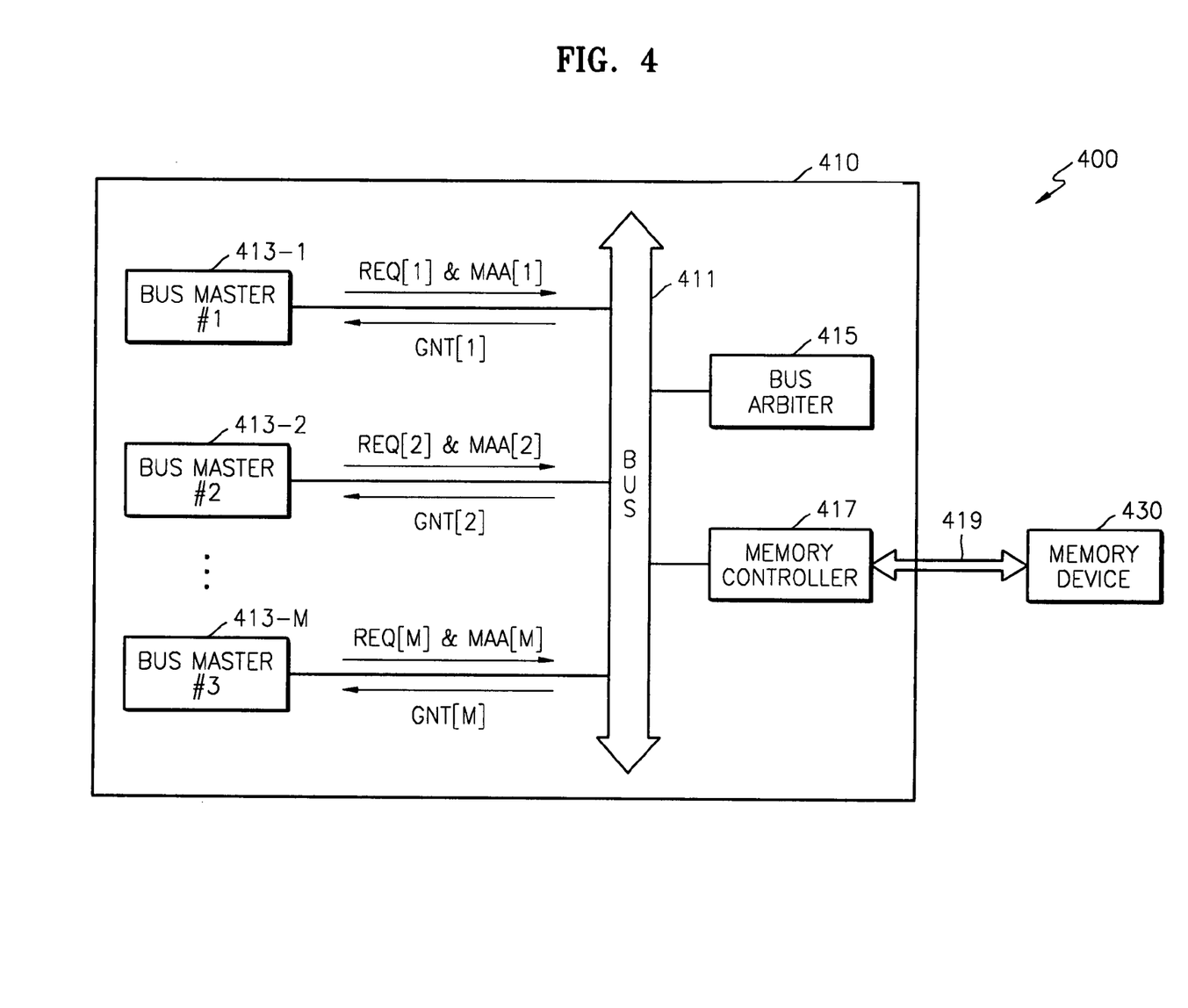
FIG. 4 illustrates a system including a bus arbiter according to an embodiment of the present invention.
Figure 5:
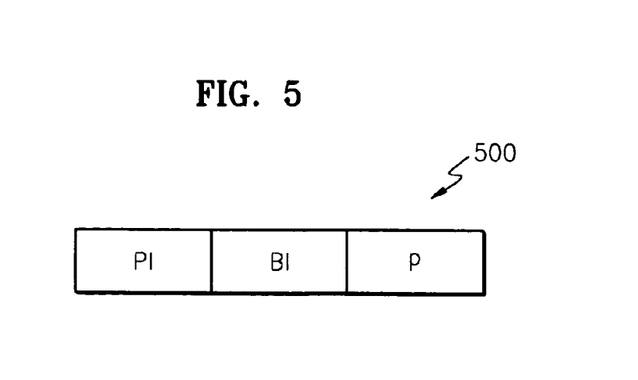
FIG. 5 illustrates a memory access address generated by each bus master of FIG. 4.

FIG. 4 illustrates a system comprising a bus arbiter according to an embodiment of the present invention. FIG. 5 illustrates a memory access address generated by each bus master of FIG. 4.

A system 400 of FIG. 4 comprises a chip 410 implemented as a system on chip (SOC) semiconductor, a memory device 430, and an external bus 419.

The chip 410 comprises a bus 411, a plurality of bus masters 413-1–413-M, a bus arbiter 415, and a memory controller 417. Each of the plurality of bus masters 413-1–413-M independently accesses the memory device 430 under the control of the bus arbiter 415 and the memory controller 417.

The plurality of the bus masters 413-1–413-M respectively generates bus request signals REQ[1]–REQ[M] and, at the same time, memory access addresses MAA[1]–MAA[M] shown in FIG. 5.

Each of the memory access addresses MAA[1]–MM[M] comprises three fields PI, BI, and p as shown in FIG. 5. The field PI denotes a page index field. The field BI denotes a bank index field. The field p denotes an offset field. The field PI stores a page index, and the field BI stores a bank index.

The memory controller 417 controls a data write operation where each of the bus masters 413-1–413-M writes data to the memory device 430 and a data read operation where each of the bus masters 413-1, 413-2, and 413-3 reads data from the memory device 430.

Figure 6:
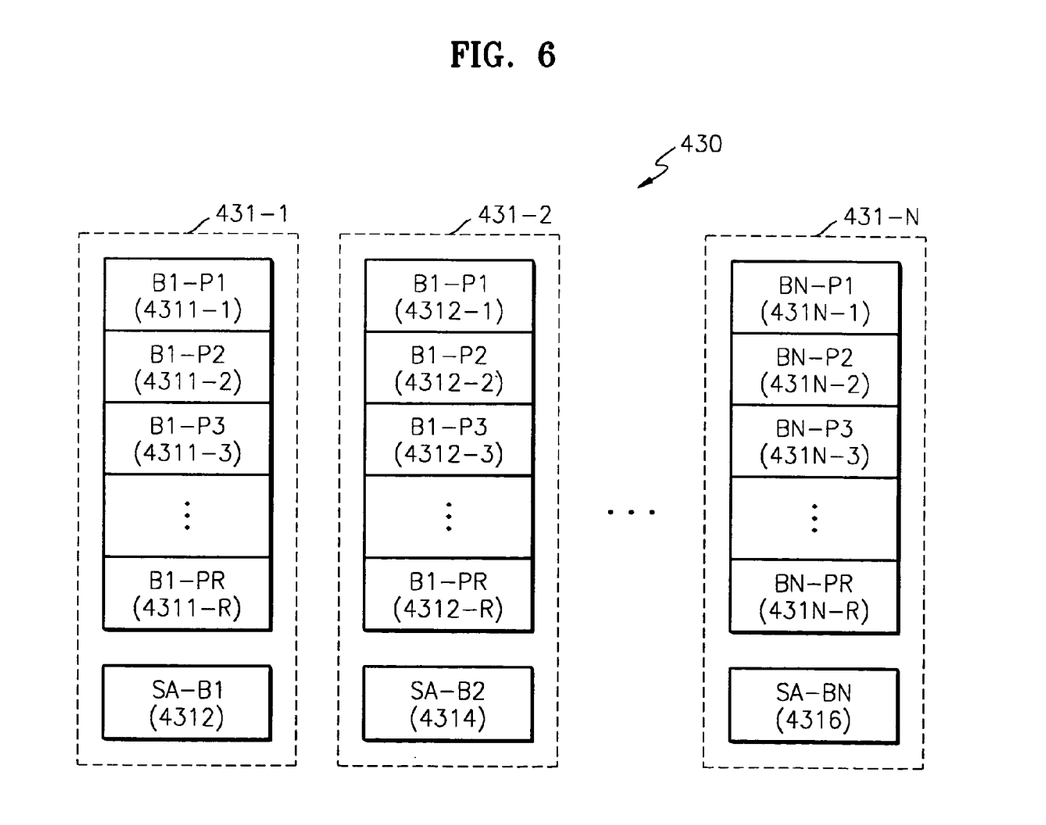
FIG. 6 illustrates an address map of a memory device of FIG. 4.

The memory device 430 comprises N memory banks 431-1–431-N, each comprising R pages and a sense amplifier, 4312–4316, respectively. The address map shown in FIG. 6 is an address map of bank interleaving.

Figure 7:
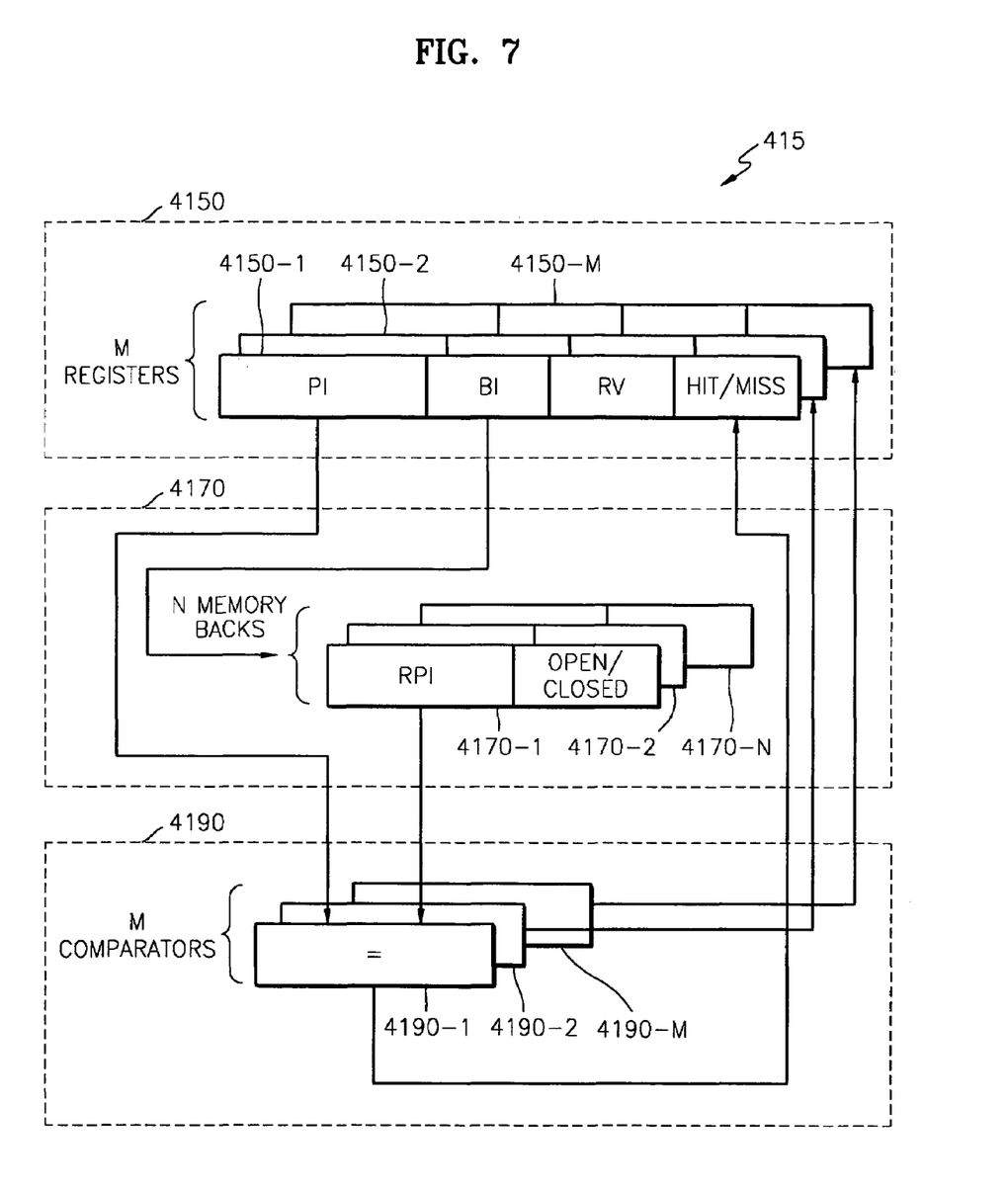
FIG. 7 illustrates a bus arbiter according to an embodiment of the present invention.

FIG. 7 illustrates a bus arbiter according to an embodiment of the present invention. Referring to FIG. 7, the bus arbiter 415 comprises a bus request register file 4150, a bank register file 4170, and a comparing circuit 4190.

Referring to FIGS. 4 and 7, the bus request register file 4150 comprises the same number of registers as the number of bus masters. Thus, the bus request register file 4150 comprises M registers 4150-1–4150-M. Each of M registers 4150-1–4150-M comprises a page index field PI, a bank index field BI, a request validity field RV, and a page hit/miss field HIT/MISS.

The PI field stores a page index requested by a corresponding bus master. The bank index field BI stores a bank index requested by the corresponding bus master.

The request validity field RV stores information about request validity. A valid bus request means that a corresponding bus master outputs a bus request signal and has an access to a memory device. The page hit/miss field HIT/MISS stores a comparison result of a comparator.

Each of the M registers 4150-1–4150-M stores a page index PI and a bank index BI of corresponding memory access address MAA[1]–MAA[M].

Since the bank register file 4170 is needed for each memory bank, the bank register file 4170 comprises N registers 4170-1–4170-N, each of which comprises an open page index field RPI and a page open/closed field OPEN/CLOSED.

The RPI field stores a page index stored in each of the sense amplifiers 4312–4316. The page open/closed field OPEN/CLOSED indicates whether a valid page is currently stored in each of the sense amplifiers 4312–4316.

The comparing circuit 4190 comprises M comparators 4190-1–4190-M, each of which compares a page index stored in the page index field PI of each of the M registers 4150-1–4150-M with an open page index stored in a register of the bank register file 4170 selected based on a bank index stored in the bank index field BI of each of the M registers 4150-1–4150-M and outputs the comparison result to the page hit/miss field HIT/MISS of the corresponding register.

Figure 8:
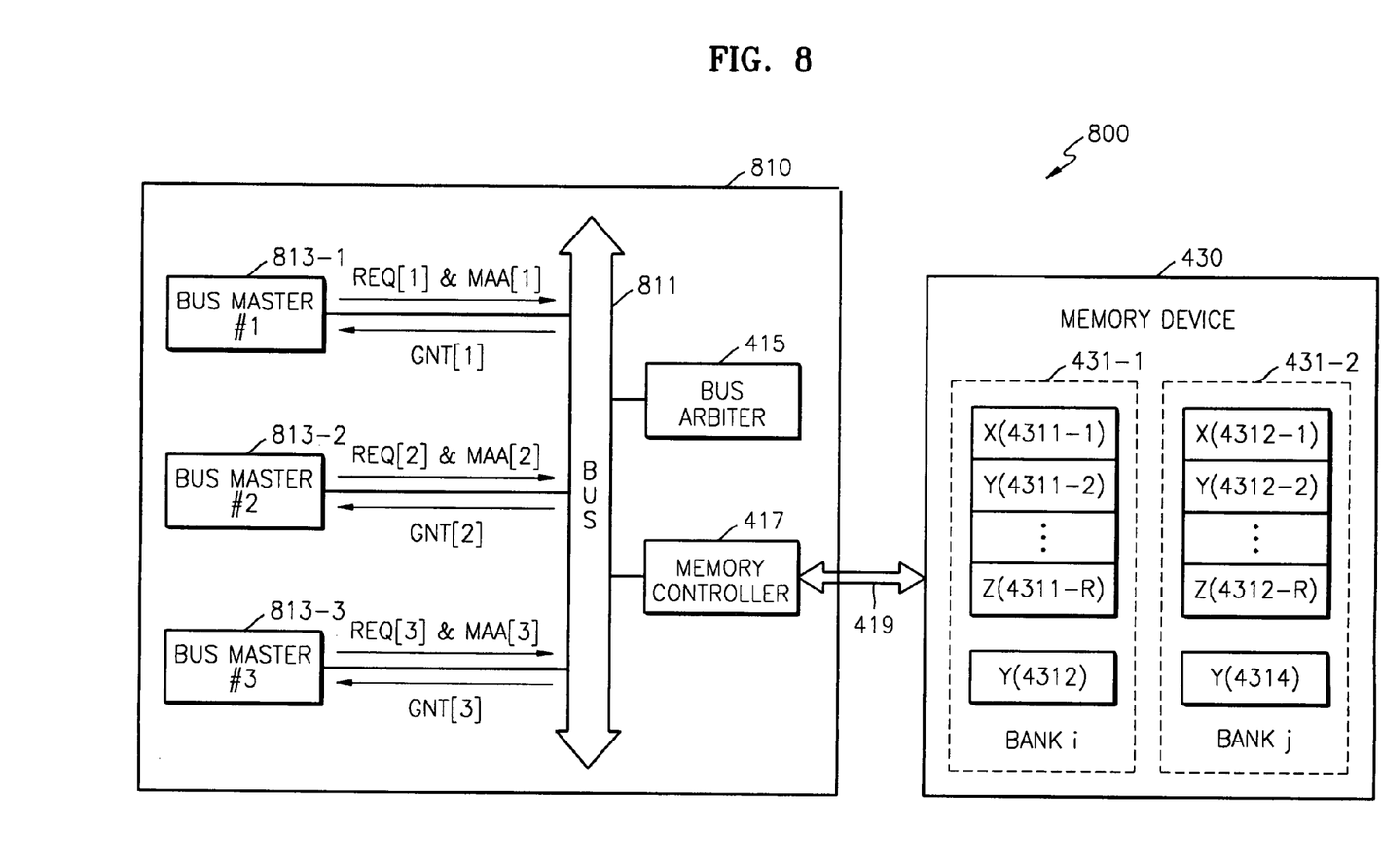
FIG. 8 illustrates a system comprising the bus arbiter of FIG. 7 and three other bus masters.

FIG. 8 illustrates a system including the bus arbiter 415 of FIG. 7 and three other bus masters. Referring to FIG. 8, a system 800 comprises a chip 810 implemented as a system on chip (SOC) semiconductor, a memory device 430, and an external bus 419.

The chip 810 comprises a bus 811, three bus masters 813-1, 813-2, and 813-3, the bus arbiter 415, and the memory controller 417.

The bus master 813-1 simultaneously outputs REQ[1] and MAA[1] to the bus arbiter 415. The bus master 813-2 simultaneously outputs REQ[2] and MAA[2] to the bus arbiter 415. The bus master 813-3 simultaneously outputs REQ[3] and MAA[3] to the bus arbiter 415.

Referring to FIGS. 5 and 8, the page index of the page index field PI of MAA[1] is X, the bank index of the bank index field BI is i, the page index of the page index field PI of MAA[2] is Y, the bank index of the bank index field BI is i, the page index of the page index field PI of MAA[3] is X, and the bank index of the bank index field BI is i. Here, i is an index denoting the bank 431-1.

The priority of the bus master 813-1 is higher than that of the bus master 813-2, and the priority of the bus master 813-2 is higher than that of the bus master 813-3.

Figure 9:
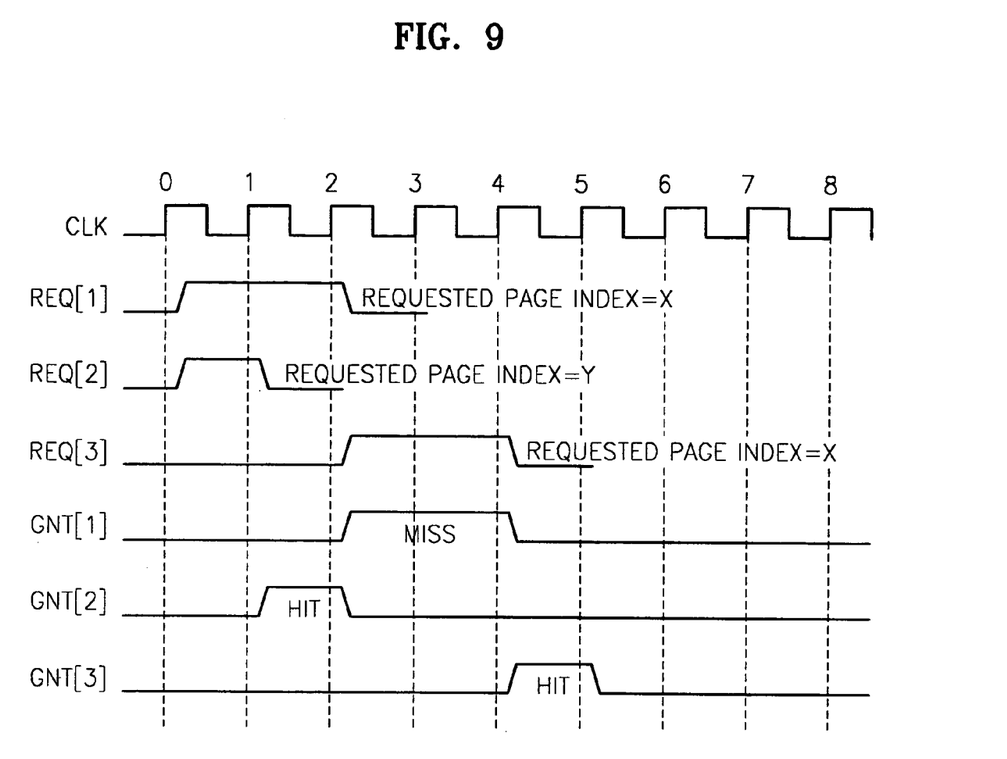
FIG. 9 illustrates a timing diagram for the operation of the system of FIG. 8.

FIG. 9 illustrates a timing diagram for the operation of the system of FIG. 8. Hereinafter, the operation of a system comprising the bus arbiter 415 will be described with reference to FIGS. 7, 8, and 9. Here, M is 3.

At a clock signal CLK number 0, the open page index stored in the sense amplifier 4312 of the memory bank 431-1 is Y. Thus, the open page index Y is stored in the page index field PI of an $i^{th}$ register of the bank register file 4170.

The page index field PI of the register 4150-1 stores the page index X and the bank index field BI of the register 4150-1 stores the bank index i. The page index field PI of the register 4150-2 stores the page index Y and the bank index field BI of the register 4150-2 stores the bank index i. The page index field PI of the register 4150-M stores the page index X and the bank index field BI of the register 4150-M stores the bank index i.

At a clock signal CLK number 1, the page index stored in the page index field PI of the register 4150-2 is Y while the open page index Y is stored in the page index field PI of the $i^{th}$ register of the bank register file 4170. Thus, the comparator 4190-2 determines as a comparison result that the page HIT occurs and adds the page HIT to the page hit/miss field HIT/MISS of the register 4150-2.

At a clock signal CLK number 2, the page index stored in the page index field PI of the register 4150-1 is X while the open page index Y is stored in the page index field PI of the $i^{th}$ register of the bank register file 4170. Thus, the comparator 4190-1 determines as a comparison result that the page MISS occurs and adds the page MISS to the page hit/miss field HIT/MISS of the register 4150-1. The page index X is stored in the open page index field RPI of the $i^{th}$ register of the bank register file 4170.

At clock signal CLK numbers 3 and 4, the page index stored in the page index field PI of the register 4150-3 is X while the open page index X is stored in the page index field PI of the $i^{th}$ register of the bank register file 4170. Thus, the comparator 4190-3 determines as a comparison result that the page HIT occurs and adds the page HIT to the page hit/miss field HIT/MISS of the register 4150-3.

Thus, the bus arbiter 415 preferentially assigns the bus grant signal GNT[2] to the bus master 813-2 that causes the page HIT, irrespective of the fixed priority.

Subsequently, the bus priority 415 preferentially assigns the bus grant signal GNT[2] over the bus grant signal GNT[1]. That is, the order of bus grant changes.

Since each bus request signal of the bus master 813-2 and the bus master 813-3 causes the page HIT, the memory access latency is relatively low as compared to a system having fixed priorities.

As such, according to a bus arbiter and a bus arbitrating method, the bus grant signal is preferentially assigned to the bus master causing the page HIT, thereby decreasing the memory access latency.

Also, the performance of the system including the bus arbiter can be improved.

While the present invention has been particularly shown and described with reference to exemplary embodiments thereof, it will be understood by those of ordinary skill in the art that various changes in form and details may be made therein without departing from the spirit and scope of the invention as defined by the appended claims and their equivalents.

What is claimed is:

1. A bus arbiter for outputting a bus grant signal to a bus master granted access to a bus based on bus request signals and memory access addresses, each of which is output from respective M bus masters connected to the bus, the bus arbiter comprising;
    a bus request register file comprising M registers, each of the M registers for storing each of the memory access addresses output from a corresponding bus master;
    a bank register file comprising N registers, each of the N registers for storing a page index stored in a sense amplifier of a corresponding memory bank of an external memory device; and
    a comparing circuit comprising M comparators, each of the M comparators for comparing a page index stored in a register of the bank register file selected based on a corresponding memory access address with a page index stored in each of the M registers of the bus request register file and outputting a page HIT or page MISS to each of the M registers of the bus request register file according to the comparison result,
    wherein the bus arbiter preferentially grants a bus master causing the page HIT access to the bus.

2. The bus arbiter of claim 1, wherein the bus arbiter assigns a bus grant signal to a bus master causing the page MISS according to a fairness scheme.

3. The bus arbiter of claim 1, wherein each of the memory access addresses comprises a page index field that stores a page index and a bank index field that stores a bank index.

4. The bus arbiter of claim 1, wherein each of the M registers comprises a page index field for storing a page index, a bank index field for storing a bank index, and a page HIT/page MISS field for storing information about the page HIT and/or the page MISS.

5. A bus arbiter for outputting a bus grant signal to a bus master granted access to a bus based on bus request signals and memory access addresses, each of which is output from respective M bus masters connected to the bus, the bus arbiter comprising;
    a request register file comprising M registers;
    a bank register file comprising N registers; and
    a comparing circuit comprising M comparators,
    wherein each of the M registers comprises a page index field for storing a page index output from a corresponding bus master and a bank index for storing a bank index output from the corresponding bus master,
    each of the N registers comprises an open page index field that stores a page index stored in a sense amplifier of a memory bank of an external memory device,
    each of the M comparators for comparing a page index stored in an index page field of each of the M registers with an open page index stored in a register of the bank register file selected based on a bank index stored in a bank index field of each of the M registers and outputting the comparison result to a page HIT/page MISS field of each of the M registers,
    wherein the bus arbiter preferentially grants a bus master causing the page HIT access to the bus.

6. The bus arbiter of claim 5, wherein the bus arbiter assigns a bus grant signal to a bus master causing the page MISS according to a fairness scheme.

7. A bus arbitrating method by which a bus grant signal is output to a bus master granted access to a bus based on bus request signals and memory access addresses, each of which is output from a plurality of bus masters connected to the bus, the bus arbitrating method comprising;
    storing a page index and a bank index, included in each of the memory access addresses, in a corresponding register of a bus request register file;
    storing a corresponding open page index and searching for a register corresponding to the bank index;
    comparing the page index with the open page index and storing a page HIT/page MISS in the corresponding register of the bus request register file according to the comparison result; and
    assigning, preferentially, a bus grant signal granting access to the bus to a bus master causing the page HIT.

8. The bus arbitrating method of claim 7, further comprising assigning a bus grant signal to a bus master causing the page MISS according to a fairness scheme.

* * * * *